United States Patent [19]

Dobsa et al.

[11] Patent Number: 4,567,424
[45] Date of Patent: Jan. 28, 1986

[54] REACTIVE POWER COMPENSATOR WITH CAPACITOR AND CAPACITOR DISCHARGE CIRCUIT

[75] Inventors: Josip Dobsa, Oberrohrdorf; Peter Mauchle, Wettingen; Walter Pfyl, Ennetbaden, all of Switzerland; Kadry Sadek, Lauchringen, Fed. Rep. of Germany

[73] Assignee: BBC Brown, Boveri & Company, Limited, Baden, Switzerland

[21] Appl. No.: 576,275

[22] Filed: Feb. 2, 1984

[30] Foreign Application Priority Data

Feb. 8, 1983 [EP] European Pat. Off. ........ 83200196.0
Jan. 9, 1984 [EP] European Pat. Off. ........ 84100127.4

[51] Int. Cl.$^4$ ............................................. H02J 3/18
[52] U.S. Cl. ..................................... 323/210; 307/109; 320/1
[58] Field of Search ............... 323/206, 208, 209, 210, 323/299; 307/107, 108, 109, 110; 336/155, 160, 165; 363/57; 520/1

[56] References Cited

U.S. PATENT DOCUMENTS

| | | | |
|---|---|---|---|
| 3,187,156 | 6/1965 | Seulen et al. | 323/209 |
| 3,955,134 | 5/1976 | Woodford | 323/210 |
| 4,210,860 | 7/1980 | Rosa et al. | 323/210 |
| 4,434,376 | 2/1984 | Hingorani | 323/210 |

FOREIGN PATENT DOCUMENTS 2303939  6/1982  Fed. Rep. of Germany ...... 323/210

*Primary Examiner*—Peter S. Wong
*Assistant Examiner*—D. L. Rebsch
*Attorney, Agent, or Firm*—Burns, Doane, Swecker & Mathis

[57] ABSTRACT

In a reactive power compensator used for capacitive or inductive reactive powers in alternating-voltage networks, a capacitor is connected to an alternating-voltage network for a short time by means of a thyristor switch. In order to reduce the voltage load on the thyristor switch, a discharge circuit is connected in parallel with the capacitor. Via this circuit, the capacitor can discharge, after being disconnected from the alternating-voltage network, with such a speed that the voltage occurring at the thyristor switch is no greater than about 1.5 times the maximum network voltage. In the discharge circuit, a variable inductive reactive resistance can be a discharge circuit choke having an iron core or the primary winding of a transformer. When the capacitor is connected to the alternating-voltage network, the discharge circuit choke is unsaturated and its reactive resistnace is large (or the transformer secondary is open) so that no significant leakage current can flow via the discharge circuit. After the capacitor is disconnected from the alternating-voltage network, the discharge circuit choke is saturated and its reactive resistance is small (or the transformer secondary is shortcircuited) so that a large discharge current can flow. No switching element is required in the discharge circuit. In order to limit the rectifier current of the thyristor switch and to change this rectifier current with time, an air choke is provided. The maximum rectifier voltage is limited by surge dissipators of zinc oxide.

30 Claims, 7 Drawing Figures

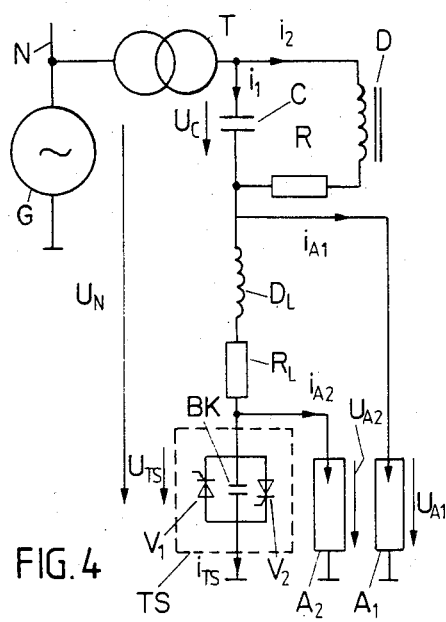
FIG. 4
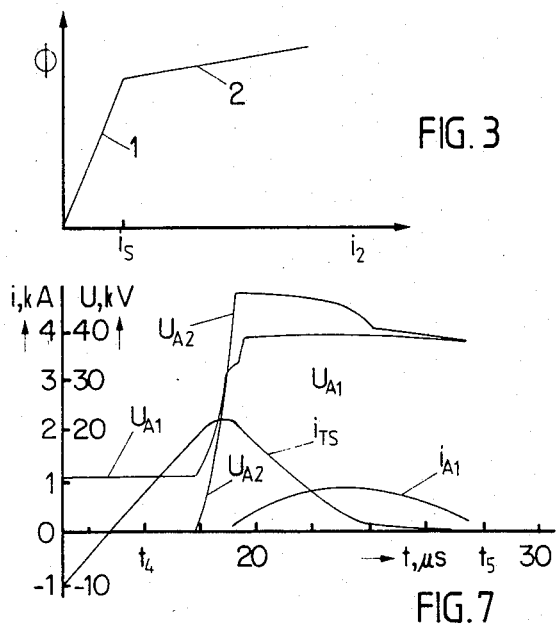
FIG. 3
FIG. 7
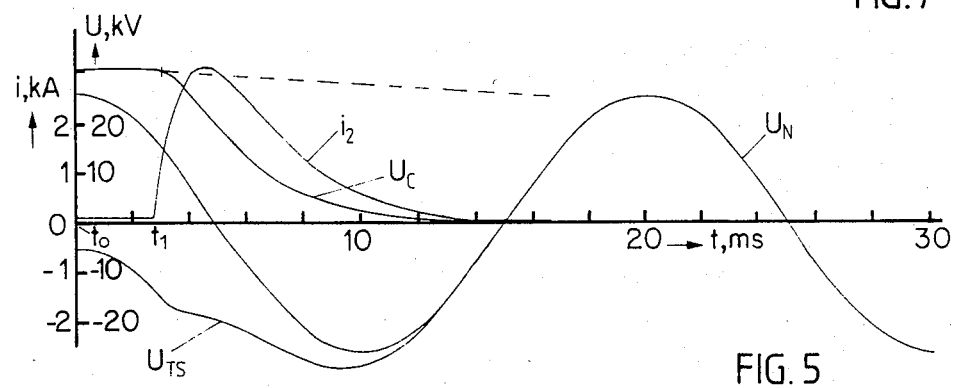
FIG. 5
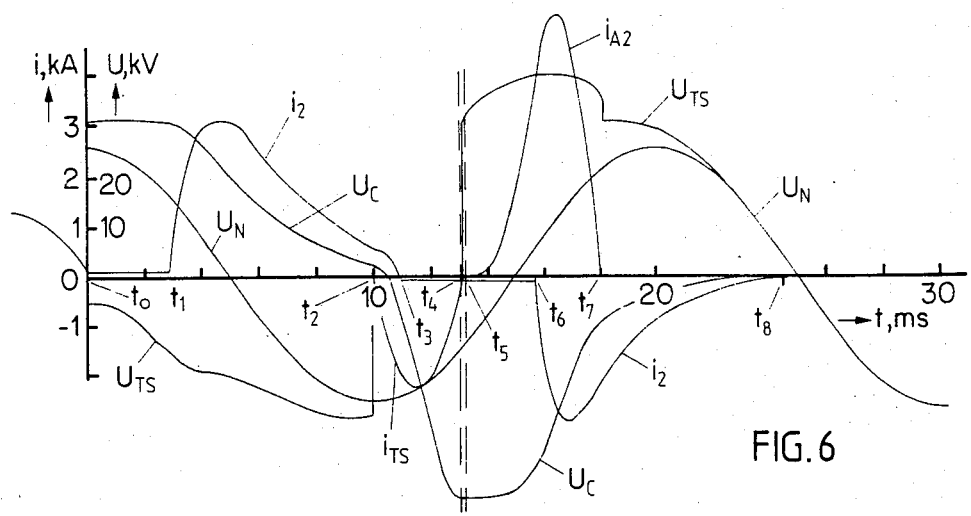
FIG. 6

REACTIVE POWER COMPENSATOR WITH CAPACITOR AND CAPACITOR DISCHARGE CIRCUIT

BACKGROUND OF THE INVENTION

The present invention relates to reactive power compensators of the general type described in German Pat. No. 2,303,939. In the circuit of this patent, a compensation capacitor is precharged to the peak value of the network alternating voltage during a quarter period of the alternating voltage. The capacitor is connected by means of a thyristor switch, and via a choke, to the alternating current network to be compensated when the voltage at the thyristor switch is approximately 0. Within a quarter period after the switch-off time of the capacitor, the latter is discharged by the firing of the thyristor switch.

If in such an arrangement the thyristor switch is closed, i.e. electrically conducting, and the capacitor is thus connected to the alternating voltage network, the voltage across the capacitor corresponds at any instant to the network voltage. If the capacitor is disconnected from the alternating voltage network by opening the thyristor switch, the voltage at one terminal of the thyristor switch is the same as that of the capacitor at the time of switching. Subsequently, as the capacitor voltage and the network voltage change, the voltage difference across the thyristor changes.

The capacitor voltage decreases in time, at least in the mean, by being discharged via a discharge circuit connected in parallel with it. As a rule, the capacitor is disconnected from the alternating voltage network at the zero transition of the current, that is to say at the time of maximum network voltage. If the discharging of the capacitor via the discharge circuit is a slow process in comparison with the duration of a cycle of the alternating voltage, practically twice the maximum network voltage is present across the thyristor switch after half a cycle's duration. In order that the thyristor switch need be dimensioned only for a single maximum mains voltage, which is of considerable advantage for economic reasons, the capacitor must be capable of being discharged fast enough via its discharge circuit, at most over half a period of the alternating voltage. The duration of half a period is 10 ms with a 50 Hz frequency of the alternating voltage. The capacitor customarily has a capacity of the order of magnitude of some 100 $\mu$F. In order for such a large capacitance to be discharged at all in 10 ms, the discharge circuit must have a low impedance. A purely ohmic resistance in the discharge circuit should be, for example, only a few ohms, which practically represents a short circuit for the capacitor, with a correspondingly high power loss. Such a loss cannot be tolerated when the capacitor is connected to the alternating voltage mains. This power loss can be limited by a switch which is arranged in the discharge circuit and which is preferably a fast-acting semiconductor switch that is open during the time the capacitor is connected to the alternating voltage mains and is closed only when the capacitor is disconnected from the alternating voltage mains for initiation of the discharge process. Such a switch must be dimensioned for the full maximum mains voltage and, therefore, also involves high costs.

In accordance with the previously mentioned German Pat. No. 2,303,939, the capacitor can be discharged via a transformer into an auxiliary voltage network. Together with the inductance of a choke arranged in the discharge circuit, the inductance of the primary winding of the transformer, which is also arranged in the discharge circuit, and the capacitor form a resonant circuit. This arrangement also requires a switch in the discharge circuit, by means of which switch a free compensating oscillation can be switched on at the time the capacitor is disconnected from the alternating voltage mains and can subsequently be interrupted.

STATEMENT OF THE INVENTION

It is the object of the present invention to provide a reactive power compensator which is not loaded very much by voltage and which does not require any switching elements in the discharge circuit of the compensating capacitor.

An advantage of the invention lies in the fact that a rapid and continuous discharging of the capacitor, after it has been disconnected from the alternating voltage mains, takes place without any switching elements being arranged in the discharge circuit of the capacitor. This approach avoids the use of components that are expensive and susceptible to faults, and is achieved with simple means.

According to a particular development of the invention, a specially dimensioned iron choke coil can be used, with a second winding also being provided for an especially fast remagnetization of the iron coil, if necessary. Instead of this iron choke coil, a specially dimensioned transformer can also be used which has, in its secondary circuit, a shorting switch that also provides the capability of very fast remagnetization and thus a fast discharging of the reactive power capacitor. The result of this is that the rectifier voltage is relatively low and thus costs for expensive high-voltage thyristors are avoided.

In accordance with another advantageous development of the invention, destruction of thyristor rectifiers due to a dual misfiring can be reliably prevented.

With respect to the relevant state of the art, additional reference is made to U.S. Pat. No. 3,731,183 from which a circuit for compensating reactive power for the purpose of power control and correction of the phase angle of an inductive load is known. This circuit is provided with a series circuit of a capacitor, a choke, and if necessary a resistance and a thyristor rectifier connected via a transformer to an alternating voltage mains. In parallel with the thyristor rectifier, a series circuit consisting of a resistance and a capacitor, and, in parallel with the capacitor, a series circuit consisting of an air coil (induction furnace) and a discharge resistance for the capacitor can be provided. This resistance is also connected to the secondary side of the transformer. No provision is made for varistors to act as surge dissipators so that the capacitor is discharged relatively slowly. The choke is used for attenuating oscillations which can occur between adjacent absorption circuits.

BRIEF DESCRIPTION OF THE DRAWINGS

In the text which follows, the invention is explained with the aid of the illustrative embodiments shown in the drawings, in which:

FIG. 3 shows in a diagram the magnetization characteristic of an iron core of the choke, FIG. 4 shows a circuit diagram of a third embodiment of the invention having surge dissipators, FIG. 5 shows a diagram of the time characteristic of current and voltage values for the case where a saturation choke is connected in parallel with the capacitor, in the undisturbed case after the compensating capacitor has been switched off, FIG. 6 shows a diagram according to FIG. 5 for the case of a misfiring of a thyristor rectifier, and FIG. 7 shows a diagram of the region of time shown with dashes in FIG. 6 on a different time scale.

DESCRIPTION OF THE ILLUSTRATED EMBODIMENTS

In the Figures, corresponding parts and values are provided with corresponding reference designations.

Figure 1:
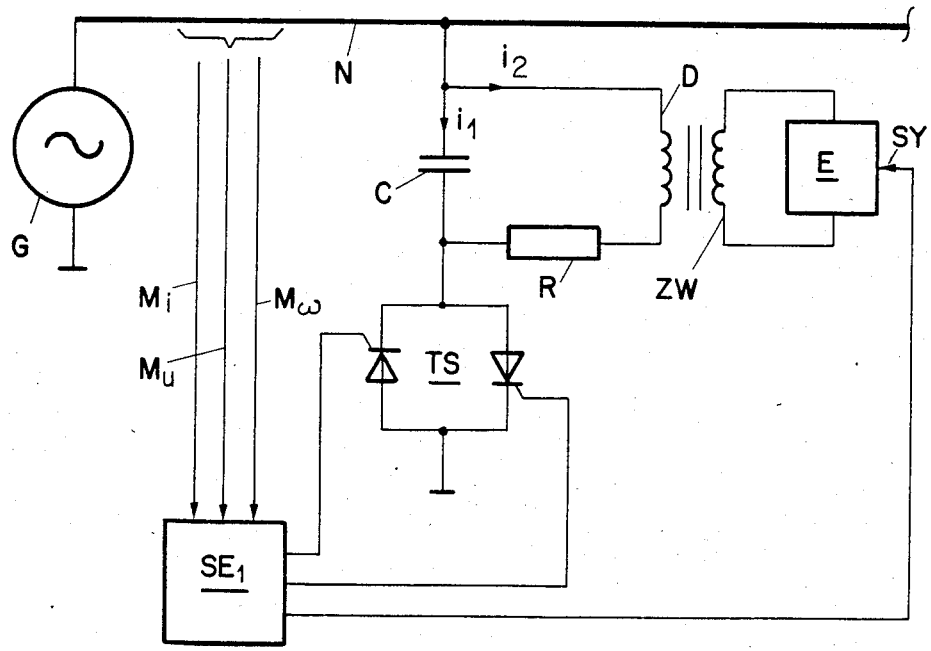
FIG. 1 shows a circuit diagram of a first embodiment of the invention having an iron choke in the discharge circuit.

In FIG. 1, N designates a line of an electric alternating voltage network which is fed by a generator G. To the network N, a reactive power capacitor C is connected in series with a thyristor switch TS which is composed, for example, of opposed parallel thyristors. The triggering gates of the thyristors are connected to a first control unit $SE_1$. The control unit is fed with electric current, voltage and frequency signals $M_i$, $M_u$, $M_\omega$ derived as input variables from the alternating voltage network N. If reactive power is required in the alternating voltage network N, the first control unit $SE_1$ generates from these signals, in a conventional manner not explained in greater detail herein, triggering pulses in the correct phase for the thyristors of the thyristor switch TS. The capacitor C is connected in parallel with a discharge circuit which has, as a variable reactive impedance, a discharging circuit choke D provided with an iron core. The effective ohmic resistance of the choke winding is designated by R and shown separately from the discharge circuit choke D.

Together with the discharge circuit choke D, the capacitor C forms a resonant circuit. As a parallel resonant circuit, this is connected to the alternating voltage network N in series with the thyristor switch TS. If the thyristor switch TS is closed, at least one of the two thyristors shown in FIG. 1 is turned on after being triggered by the first control unit $SE_1$, and an oscillation having the frequency of the alternating voltage in the alternating voltage network N, that is to say the network frequency $\omega_N$, is imposed on the parallel resonant circuit. According to Kirchoff's Laws for a parallel circuit, the currents $i_1$ through the capacitor C and $i_2$ through the discharge-circuit choke D and the resistance R behave inversely to the resistances in the parallel branches. By using a sufficiently large inductance in the discharge-circuit choke D, the current in the capacitor branch $i_1$ can be made to exceed the current in the choke branch $i_2$ by some (for example 3 to 4) powers of 10. Compared with the reactive power occurring in the capacitor branch, the power loss in the choke branch, or more accurately in the ohmic resistance R, is then of no consequence. For this reason, the discharge circuit of the capacitor C can be advantageously continuously closed, even when it is connected to the alternating voltage network. A switching element in the discharge circuit would thus be superfluous in this case.

FIG. 3 shows the magnetization characteristic of the iron core of the discharge circuit choke D. The magnetic flux $\phi$ is here plotted against the current $i_2$ through the discharge circuit choke D and is composed, greatly idealized, of two straight-line sections designated by 1 and 2. With small values of current, the magnetic flux steeply rises (straight-line section 1). In this region, the iron core is unsaturated and the inductance of the discharge circuit choke D resulting from the slope of the straight-line section is large. With a saturation current value $i_S$, the iron core is saturated. The magnetic flux $\phi$ rises only slowly above this saturation current value $i_S$. Within the context of the invention it is preferable to make the straight-line section 1 as steep as possible and the straight-line section 2 as flat as possible. The former can be achieved, among other ways, by using an approximately toroidal iron core which is closed on itself. This largely eliminates leakage of the magnetic flux $\phi$. The latter can be achieved, for example, by uniform distribution of the choke winding over the entire iron core. This reduces to a minimum the ratio of the number of turns to the length of discharge circuit choke D, which also determines the magnitude of the air inductance.

The saturation flux is preferably dimensioned to be approximately 1.3 times the flux flowing through the discharge circuit choke D with a network frequency $\omega_N$ when the capacitor C is connected to the alternating-voltage network N. This allows for the occurrence of small overvoltages in the alternating-voltage network N and associated overcurrents, during the occurrence of which the discharge circuit choke D should not be saturated.

The saturation characteristic of the discharge circuit choke D becomes effective only as soon as the capacitor C is disconnected from the alternating-voltage network by opening the thyristor switch TS. From this time, an oscillation having the network frequency $\omega_N$ predetermined by the alternating-voltage network N is no longer imposed on the resonant circuit consisting of capacitor C and discharge circuit choke D. The resonant circuit continues to oscillate freely with a damped oscillation at its natural frequency, that is to say its characteristic frequency $\omega_E$ determined by the capacity of the capacitor C, the inductance of the unsaturated discharge circuit choke D and the ohmic resistance R. As a consequence of the discharge circuit choke having been dimensioned in such a manner that, when the capacitor C is connected to the alternating-voltage network N, the current $i_1$ through the capacitor considerably exceeds the current $i_2$ through the choke, the natural frequency $\omega_E$ will be much lower than the network frequency $\omega_N$. Because of the lower natural frequency $\omega_E$, the choke represents a smaller resistance for the free damped oscillation than for the imposed oscillation having the network frequency $\omega_N$. Since the capacitor C is disconnected from the alternating-voltage network N whenever the network voltage is at a maximum, the maximum network voltage $U_N$ is also present at the capacitor C at the initiation of the free damped oscillation. Under these conditions, the current through the discharge circuit choke D considerably exceeds the current of the imposed oscillation, when the free damped oscillation is present, and drives the iron core of the discharge circuit choke D into saturation.

When saturation occurs, the inductance and with it the resistance of the discharge circuit choke D decreases, which causes both the current through the discharge circuit choke D and the natural frequency $\omega_E$ of the free damped oscillation to increase. The result is a rapid discharging of the capacitor C.

The damping resistance R of the winding of the discharge circuit choke D is preferably selected in such a manner that the discharging of the capacitor effectively corresponds to an RC discharge with aperiodic damping, with $$R = 2\sqrt{L/C},$$

where L is the inductance of the discharge circuit choke D in the saturated region.

The ohmic resistance R is preferably the effective resistance of the winding of the discharge circuit choke D for which, for example, a material having a higher specific resistance than copper or aluminum is used.

In summary, the foregoing shows that the discharge circuit choke D, as a result of the saturation characteristic of its iron core, acts in the discharge circuit as a variable reactive impedance which is greater when the capacitor C is connected to the alternating-voltage network N, that is to say with a closed thyristor switch TS, than when the capacitor C is disconnected from the alternating-voltage network N with an open thyristor switch TS. The difference between these two conditions is here so considerable that in the first-mentioned case only a small, insignificant current $i_2$ flows in the discharge circuit, whereas in the second case a large current $i_2$ can flow which discharges the capacitor C in less than half a period of the alternating voltage. In addition, the discharge circuit can be continuously closed. It is not necessary to interrupt the discharge circuit during the time the capacitor C is connected to the alternating-voltage N.

Advantageously, an additional winding ZW can be placed around the iron core of the discharge circuit choke D as shown in FIG. 1, to which additional winding a facility E for accelerated remagnetization of the iron core is connected. This facility is connected to the first control unit $SE_1$ via a control line SY for synchronization purposes. This makes it possible to achieve a great reduction in the period of time which elapses after the capacitor C has been disconnected from the alternating-voltage network N and the free damped oscillation has started, until the current in the discharge circuit choke D has risen to such an extent that saturation occurs. As a result of the hysteresis effect, a magnetization current with the correct polarity flows—with maximum network voltage and disappearing magnetic flux $\phi$ in the discharge circuit choke D—in the discharge circuit choke D at the time the capacitor C is disconnected from the alternating-voltage network N, which magnetization current reaches the saturation value $i_S$ within only a few milliseconds after the free damped oscillation has started.

Figure 2:
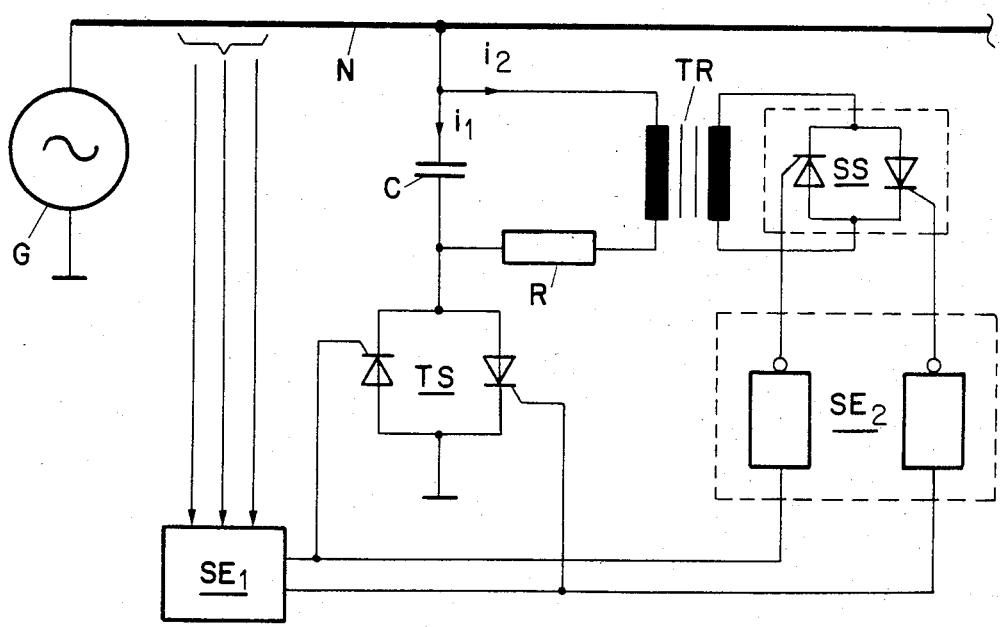
FIG. 2 shows a circuit diagram of a second embodiment of the invention having a transformer in the discharge circuit.

In accordance with another embodiment of the invention, shown in FIG. 2, a transformer TR is provided as a variable reactive impedance in the discharge circuit. The primary side of this transformer is connected to the discharge circuit. A controllable switching element SS is arranged in the secondary circuit of the transformer TR. The controllable switching element SS can be used to short-circuit and disconnect the secondary circuit of the transformer TR. The controllable switching element SS is preferably made of opposed, parallel thyristors. The controllable circuit element SS is associated with a second control unit $SE_2$, which, like the first control unit $SE_1$, generates triggering pulses for the thyristors. For synchronization, the second control unit $SE_2$ is coupled to the first control unit $SE_1$. The second control unit $SE_2$ generates triggering pulses for the thyristors of the controllable switching element SS at the exact time when the first control unit $SE_1$ is not generating any triggering pulses for the thyristors of the thyristor switch TS, and vice versa. The second control unit $SE_2$, therefore, only needs to invert the control signal of the first control unit $SE_1$. The result is that the controllable switching element SS is open or closed, respectively, whenever the thyristor switch TS is in the opposite state.

This embodiment of the invention makes use of the fact that, when the secondary circuit of the transformer TR is open, the full inductance of the primary winding, the so-called no-load inductance, is active in its primary circuit, whereas, when the secondary circuit is closed, the so-called short-circuit or leakage impedance of the transformer is active. Accordingly, when the secondary circuit is open, the transformer TR acts as a large reactive impedance in the discharge circuit (while the capacitor C is connected to the alternating-voltage network) so that in the discharge circuit, as previously explained in the case of the discharge circuit choke D, only a small current $i_2$ can flow. When the secondary circuit is closed, the transformer TR acts as a small reactive resistance (when the capacitor is disconnected from the alternating-voltage network N) so that, as previously explained in the case of the discharge circuit choke, the capacitor can rapidly discharge through a free damped oscillation. A switching element is likewise superfluous in the discharge circuit of this embodiment. Compared with having a switching element in the discharge circuit, the controllable switching element SS in the secondary circuit of the transformer TR offers the great advantage in that it needs to be designed only for a secondary voltage of the transformer TR, which is stepped down and therefore is much lower.

In a third embodiment of the invention, shown in FIG. 4, the capacitor C is connected to the alternating-voltage network N via a transformer T. The discharge circuit D and its effective resistance R are again connected in parallel with the capacitor C. In the circuit with the capacitor C and the thyristor switch TS, an air choke $D_L$ with an effective resistance designated by $R_L$ limits the rectifier current $i_{TS}$ during transient events.

The thyristor switch TS is provided with two thyristors $V_1$ and $V_2$ in parallel with a load capacitor BK. The rectifier current and the rectifier voltage at the thyristor switch TS are labelled $i_{TS}$ and $U_{TS}$, respectively. In parallel with the series circuit consisting of the air choke $D_L$ and the thyristor switch TS, a first varistor or surge dissipator $A_1$ is connected and, in parallel with the thyristor switch TS, a second varistor or surge dissipator $A_2$ is connected. The two surge dissipators $A_1$ and $A_2$ are voltage-dependent resistances consisting of a metal oxide, preferably of zinc oxide, the resistance value of which drops with increasing voltage from a predeterminable protection level or protective voltage. The protective level of the first surge dissipator $A_1$ is preferably greater than twice the amplitude of the network voltage $U_N$ occurring on the secondary or low-voltage side of the transformer T. The protection level of the second surge dissipator $A_2$ is preferably equal to or greater than the protection level of the first surge dissipator $A_1$; with respect to power, however, the second surge dissipator $A_2$ is designed to be weaker than the first surge dissipator $A_1$. The currents through the surge dissipators $A_1$ and $A_2$ are designated $i_{A1}$ and $i_{A2}$ and the voltage drops occurring when current passes through them are designated $UA_1$ and $UA_2$.

In the text which follows, the action of the circuit shown in FIG. 4 is explained with the aid of FIGS. 5 to 7 in which, on the ordinate, the current i is plotted in kA and the voltage U in kV and, on the abscissa, the time t is plotted in ms (FIGS. 5 and 6) or in $\mu$s (FIG. 7).

FIG. 5 shows the time characteristic of the sinusoidal network voltage $U_N$, the voltage $U_C$ of the reactive-power capacitor C, the rectifier voltage $U_{TS}$ and the capacitor discharge current $i_2$ for the undisturbed case when the compensating capacitor is being switched off. The following applies to the rectifier voltage $U_{TS}$:

$$U_{TS} = U_N - U_C$$

From the turn-off time $t_0$ of the thyristor switch TS to the time $t_1$ at which the iron core of the discharge circuit choke D reaches saturation, the capacitor voltage $U_C$ is approximately constant and the capacitor discharge current $i_2$ is low because of the high resistance of the discharge circuit choke D. After that, the capacitor discharge circuit $i_2$ steeply rises and discharges the capacitor C within half a cycle of the network frequency $\omega_n$. The maximum rectifier voltage $U_{TS}$ here becomes only about 15% greater than the network voltage amplitude.

Without a discharge circuit having a discharge circuit choke D, the capacitor C would discharge only very slowly, corresponding to the line shown in dashes in FIG. 5. The consequence of this would be that at the time of the minimum of the network voltage $U_N$ the rectifier voltage $U_{TS}$ would be about twice as great as the network voltage amplitude. For the thyristor switch TS relatively expensive thyristors with increased electric strength would have to be used or several thyristor switches TS would have to be connected in series. If now one thyristor were to misfire at the worst time, the capacitor C would recharge to a maximum of three times the network voltage amplitude. The rectifier voltage $U_{TS}$ would be reduced by the surge dissipators $A_1$ and $A_2$ connected in parallel with the air choke $D_L$ and the thyristor switch TS.

If now, having the discharge circuit choke D in accordance with FIG. 4, the thyristor $V_1$ were to misfire at the worst time $t_2$, the capacitor C also recharges as shown in FIG. 6. However, since the capacitor is almost completely discharged, it is recharged only to twice the network voltage amplitude. At time $t_2$, the rectifier voltage$=0$ and a negative rectifier current $i_{TS}$ flows which disappears approximately at time $t_4$ and then for a brief period flows in the opposite direction (see FIG. 7) and finally, approximately at time $t_5$, disappears after which the conducting thyristor automatically cuts off again.

The rectifier current $I_{TS}$ represents the recharge current for the capacitor C. The capacitor C and its discharge circuit form, in conjunction with the air choke $D_L$ and the inductance of the transformer T and the alternating-voltage network N, a series-resonant circuit which determines the time characteristic of the rectifier current $i_{TS}$ and of the capacitor voltage $U_C$. The frequency of the oscillation corresponds to the natural frequency of this series-resonant circuit which is set by means of the air choke $D_L$ in such a manner that the rectifier current $i_{TS}$ does not rise too steeply and does not have too high a peak value in the thyristor switch TS. This series-resonant circuit, as an absorption circuit, is preferably tuned to a harmonic of the network current to be compensated. The oscillation is interrupted at time $t_5$. As a result of the high capacitor voltage at time $t_5$ and the relatively low network voltage $U_N$, a high rectifier voltage $U_{TS}$ and high rectifier voltages $U_{A1}$, $U_{A2}$ occur. In consequence, a considerable dissipator current $i_{A1}$ flows in the first surge dissipator $A_1$ between $t_4$ and $t_5$. At time $t_5$, the dissipator current $i_{A2}$ also starts in the second surge dissipator $A_2$ and this lasts until time $t_7$ and effects a reduction in the rectifier voltage $U_{TS}$. At time $t_6$ the iron core of the discharge circuit choke D is saturated again, in the opposite direction as at time $t_1$, so that a strong capacitor discharge current $i_2$ starts which discharges the capacitor C within a half a period of the network frequency until time $t_8$. After this discharging, the rectifier voltage $U_{TS}$ corresponds to the network voltage $U_N$, as in the undisturbed case according to FIG. 5.

If a second misfiring now occurs of the thyristor $V_2$ for example, whilst the first surge dissipator $A_1$ is still carrying the dissipator current $i_{A1}$, this current will be commutated to the rectifier current path through $V_2$ and in the latter will lead to a current increase. If the steepness of the current increase exceeds the velocity of propagation of the conductivity on the area of the triggered thyristor $V_2$, the latter could be destroyed by local overheating if no protective measures are taken. As a protective measure, in this case the air choke $D_L$ is effective, which limits the current increase. This embodiment of the invention reliably prevents destruction of thyristor rectifiers even when a double misfiring occurs.

In FIGS. 1, 2 and 4, the alternating-voltage network N is shown for simplicity's sake as a single-phase network. In a multi-phase alternating-voltage network, a compensating circuit corresponding to these figures would be provided for each phase.

Instead of a thyristor switch TS, several thyristors can be connected in series in one thyristor switch TS and/or several thyristor switches TS can be provided in series, depending on the magnitude of the alternating voltage. In the embodiment of FIG. 4, inductive reactive resistances, as in the circuits according to FIGS. 1 and 2, can be provided in the discharge circuit of the capacitor C. In FIG. 4, the control units for triggering the thyristors have been omitted for the sake of simplicity.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variation and changes may be made by those skilled in the art without departing from the spirit of the invention.

What is claimed is:

1. A reactive power compensator comprising:
   at least one thyristor switch;
   a capacitor connected in series with said thyristor switch;
   a capacitor discharge circuit having at least one inductive reactive impedance continuously connected in parallel with said capacitor, said inductive reactive impedance having a variable inductance such that its value is greater when the thyristor switch is closed and is smaller when the thyristor switch is open; and a control unit for the thyristor switch for generating triggering pulses for the thyristor switch from current and voltage measurement signals of an alternating-voltage network to be compensated.

2. A reactive power compensator according to claim 1, wherein said inductive reactive impedance includes a discharge circuit choke having an iron core that is at least largely unsaturated with the current flowing through it when the thyristor switch is closed, and is increasingly saturated with larger currents, said choke having a winding resistance that is dimensioned so as to produce a highly damped or aperiodic oscillation.

3. A reactive power compensator according to claim 2 further including a second winding around the iron core of the discharge circuit choke, and means for the accelerated remagnetization of the iron core connected to said second winding.

4. A reactive power compensator according to claim 2, wherein the winding of the discharge circuit choke is distributed over the whole iron core.

5. The reactive power compensator of claim 4, wherein said iron core is closed on itself.

6. A reactive power compensator according to claim 1, wherein said inductive reactive impedance includes a transformer having its primary winding connected in said discharge circuit, and a controllable circuit element connected to its secondary winding, said controllable circuit element being opened or closed, respectively, in the opposite sense to the thyristor switch, and wherein the resistance of said primary winding is dimensioned such that highly damped or aperiodic oscillations are produced.

7. A reactive power compensator according to claim 1 wherein said capacitor is connected in series with the thyristor switch via an air choke, and a first surge dissipator is connected in parallel with the series circuit of the air choke and the thyristor switch.

8. A reactive power compensator according to claim 7 further including a second surge dissipator connected directly in parallel with the thyristor switch.

9. A reactive power compensator according to claim 8, wherein the protective level of the first surge dissipator is greater than twice the amplitude of the network voltage and wherein the second surge dissipator has a protection level which is at least as high as that of the first surge dissipator.

10. A reactive power compensator according to claim 8 wherein said second surge dissipator is of weaker power than the first surge dissipator.

11. A reactive power compensator according to claim 9 wherein said second surge dissipator is of weaker power than the first surge dissipator.

12. A reactive power compensator according to claim 8 wherein at least one of said first and second surge dissipators is a metal oxide dissipator.

13. The reactive power compensator of claim 12 wherein said at least one dissipator is a zinc oxide dissipator.

14. A reactive power compensator comprising:

at least one thyristor switch;

a capacitor connected in series with said thyristor switch;

a discharge circuit having at least one inductive reactive impedance connected in parallel with said capacitor, said inductive reactive impedance having a variable inductance and including a discharge circuit choke having an iron core that is at least largely unsaturated with the current flowing through it when the thyristor switch is closed, and is increasingly saturated with larger currents such that said inductance is greater when the thyristor switch is closed and is smaller when the thyristor switch is open, said choke having a winding resistance that is dimensioned so as to produce a highly damped or aperiodic oscillation and further including a second winding around the iron core of the discharge circuit choke, and means for the accelerated remagnetization of the iron core connected to said second winding; and a control unit for a thyristor switch for generating triggering pulses for the thyristor switch from current and voltage measurement signals of an alternating-voltage network to be compensated.

15. A reactive power compensator comprising:

at least one thyristor switch;

a capacitor connected in series with said thyristor switch;

a discharge circuit having at least one inductive reactive impedance connected in parallel with said capacitor, said inductive reactive impedance having a variable inductance and including a discharge circuit choke having an iron core that is at least largely unsaturated with the current flowing through it when the thyristor switch is closed, and is increasingly saturated with larger currents such that said inductance is greater when the thyristor switch is open, said choke having a winding resistance that is dimensioned so as to produce a highly damped or aperiodic oscillation and wherein the winding of the discharge circuit choke is distributed over the whole iron core; and a control unit for the thyristor switch for generating triggering pulses for the thyristor switch from current and voltage measurement signals of an alternating-voltage network to be compensated.

16. The reactive power compensator of claim 15, wherein said iron core is closed on itself.

17. A reactive power compensator comprising:

at least one thyristor switch;

a capacitor connected in series with said thyristor switch via an air choke, a first surge dissipator connected in parallel with the series circuit of the air choke and the thyristor switch;

a discharge circuit having at least one inductive reactive impedance connected in parallel with said capacitor, said inductive reactive impedance having a variable inductance such that its value is greater when the thyristor switch is closed and is smaller when the thyristor switch is open; and a control unit for the thyristor switch for generating triggering pulses for the thyristor switch from current and voltage measurement signals of an alternating-voltage network to be compensated.

18. A reactive power compensator according to claim 17, further including a second surge dissipator connected directly in parallel with the thyristor switch.

19. A reactive power compensator according to claim 18, wherein
the protective level of the first surge dissipator is greater than twice the amplitude of the network voltage and wherein the second surge dissipator has a protection level which is at least as high as that of the first surge dissipator.

20. A reactive power compensator according to claim 18 wherein said second surge dissipator is of weaker power than the first surge dissipator.

21. A reactive power compensator according to claim 19 wherein said second surge dissipator is of weaker power than the first surge dissipator.

22. A reactive power compensator according to claim 18 wherein at least one of said first and second surge dissipators is a metal oxide dissipator.

23. The reactive power compensator of claim 22 wherein said at least one dissipator is a zinc oxide dissipator.

24. A reactive power compensator according to claim 6 wherein
said capacitor is connected in series with the thyristor switch via an air choke, and a first surge dissipator is connected in parallel with the series circuit of the air choke and the thyristor switch.

25. A reactive power compensator according to claim 24, further including a second surge dissipator connected directly in parallel with the thyristor switch.

26. A reactive power compensator according to claim 25, wherein
the protective level of the first surge dissipator is greater than twice the amplitude of the network voltage and wherein the second surge dissipator has a protection level which is at least as high as that of the first surge dissipator.

27. A reactive power compensator according to claim 25 wherein said second surge dissipator is of weaker power than the first surge dissipator.

28. A reactive power compensator according to claim 26 wherein said second surge dissipator is of weaker power than the first surge dissipator.

29. A reactive power compensator according to claim 25 wherein at least one of said first and second surge dissipators is a metal oxide dissipator.

30. The reactive power compensator of claim 29 wherein said at least one dissipator is a zinc oxide dissipator.

* * * * *